United States Patent [19]
Crawford et al.

[11] 3,916,944
[45] Nov. 4, 1975

[54] REACTOR VESSEL SUPPORTED BY FLEXURE MEMBER

[75] Inventors: James Darwin Crawford, Windsor, Conn.; Bernd Pankow, Westfield, Mass.

[73] Assignee: Combustion Engineering, Inc., Windsor, Conn.

[22] Filed: June 28, 1973

[21] Appl. No.: 374,716

[52] U.S. Cl. ............ 137/376; 248/DIG. 1; 248/146
[51] Int. Cl. .............................................. F16l 3/00
[58] Field of Search .......... 137/376; 176/50, 52, 87; 220/1 B; 248/13, 146, 351, DIG. 1, 146, 358; 50/167, 169, 245, 249, 263

[56] References Cited
UNITED STATES PATENTS

| | | |
|---|---|---|
| 1,766,597 | 6/1930 | Bushnell .................... 248/358 AA |
| 2,475,109 | 7/1949 | Pendleton .......................... 248/146 |
| 2,912,074 | 11/1959 | Gram .............................. 248/146 X |
| 3,129,836 | 4/1964 | Frevel ............................ 176/87 UX |
| 3,296,085 | 1/1967 | Peck et al. ........................ 176/50 X |
| 3,583,429 | 6/1971 | Desmarchais ...................... 137/376 |
| 3,660,231 | 5/1972 | Fox et al. .......................... 176/87 X |
| 3,723,247 | 3/1973 | Leine et al. ....................... 176/87 X |
| 3,771,499 | 11/1973 | Marroni et al. .................... 176/87 X |

*Primary Examiner*—Henry T. Klinksiek
*Attorney, Agent, or Firm*—Frederick A. Goettel, Jr.

[57] ABSTRACT

A reactor vessel is provided with vertical support means in the form of circumferentially spaced columns upon which the vessel is mounted. The columns are adapted to undergo flexure in order to accommodate the thermally induced displacements experienced by the vessel during operational transients.

9 Claims, 3 Drawing Figures

REACTOR VESSEL SUPPORTED BY FLEXURE MEMBER

BACKGROUND OF THE INVENTION

The present invention relates to nuclear power plants and particularly to means for supporting a nuclear reactor vessel within the plant.

Nuclear reactor vessels are normally housed within a cavity in the plant containment structure. Heretofore, it has been the practice to vertically support the vessel within the containment structure by means of appendages that extend radially from the vessel and which engage a horizontal surface of the containment structure. Thermal growth displacements between the vessel and the containment structure have been accommodated by the provision of means that enable sliding contact to exist between the vessel appendage and the containment supporting structure. The aforementioned appendages have been in the form of radially extending brackets attached to the external surface of the vessel at circumferentially spaced locations thereabout. Alternatively, it has been proposed to employ the radially extending coolant flow nozzles that penetrate the vessel wall at circumferentially spaced locations for support purposes. This latter concept is illustrated in U.S. Pat. No. 3,583,429 issued June 8, 1971 to W. E. Desmarchais.

While such reactor vessel support arrangements perform adequately during periods of normal plant operation, they may be found to be deficient in the event of a postulated plant accident. Specifically, no provision is made in the arrangements to retain the reactor vessel within the containment cavity against the vertical forces tending to expel the vessel from the containment cavity that are capable of being generated during an accident which results in loss of the primary coolant from the flow system and especially one in which rupture of a primary coolant line occurs. It has been contemplated to overcome this deficiency in prior art arrangements by providing straps or U-bolts or the like that retain the support appendage upon its associated mating surface on the containment structure. The use of such retention apparatus, however, is undesirable in that, in order to permit relative movement between the sliding members as must occur to accommodate the thermal displacements, clearances between the retention members and the retained members must be provided. These clearances create spaces or gaps between the members that enable a momentum interchange to occur which results in an increase in the vertical forces imposed on the retention members that can be accommodated only by constructing them with excessive strength capabilities. Such construction naturally increases their cost.

It is to the establishment of improved reactor vessel support structures, therefore that the present invention is directed.

SUMMARY OF THE INVENTION

According to the present invention there is provided an improved arrangement for supporting a reactor vessel within a containment structure against static and dynamic vertical loadings capable of being imposed as a result of a serious accident as well as during periods of normal plant operation. The support arrangement of the invention is, at the same time, capable of accommodating radial displacements that normally occur between the reactor vessel and the containment structure due to operational transients. The arrangement comprises a plurality of vertical columns connected between the reactor vessel and a support base within the containment structure. The columns are designed to accommodate relative displacements between the vessel and the containment structure by flexing. This eliminates the need for relative sliding movements and thus enables the columns to be securely fixed to the vessel. This elimination of a provision for relative sliding movements avoids the need for spaces or gaps between the retention members and the retained elements as occurred in prior art arrangements and, concomitantly, the danger of establishing impact forces on the retention members in the event of an accident is reduced.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENT

Figure 1:
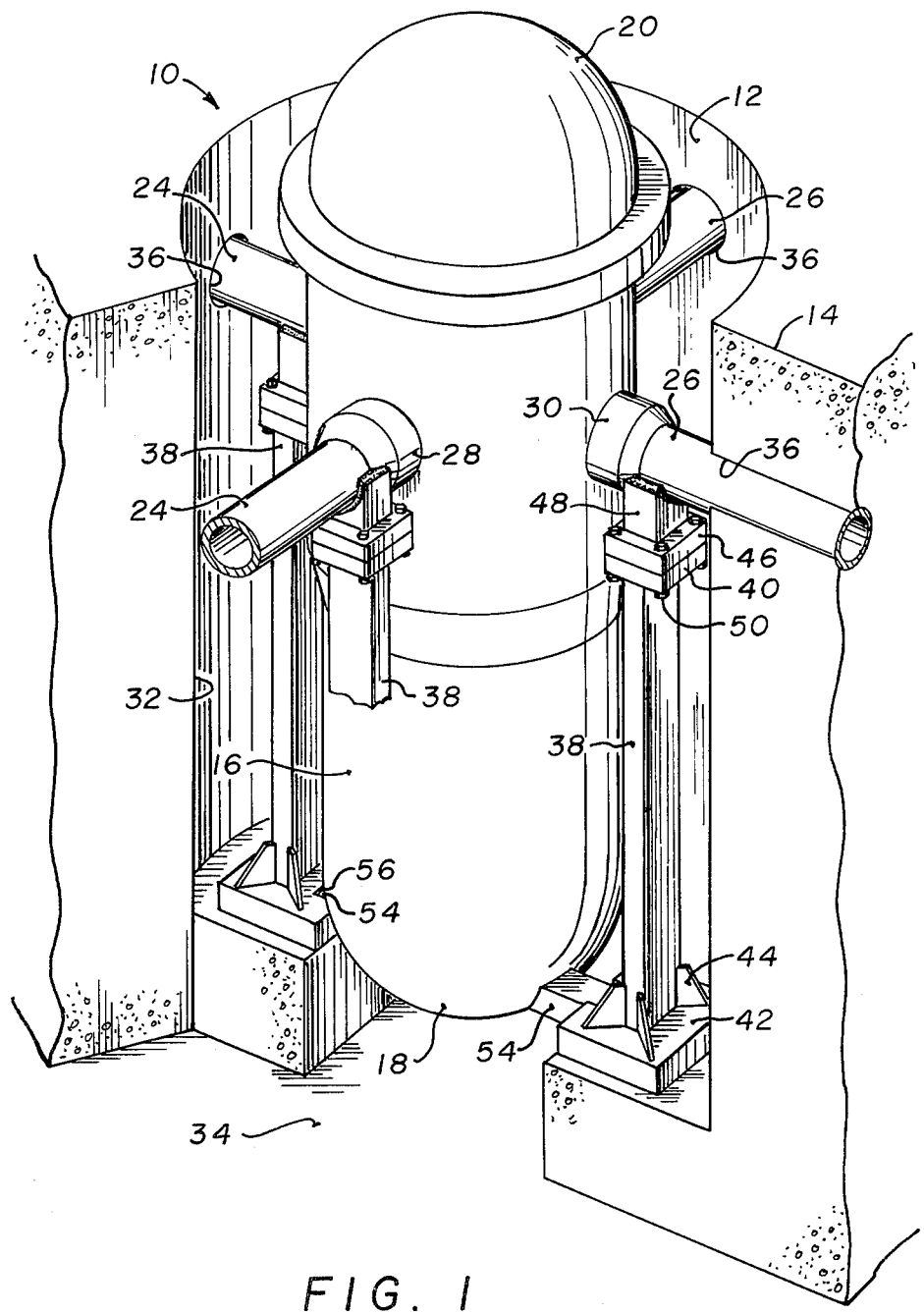
FIG. 1 is a pictorial representation of a nuclear reactor pressure vessel mounted within a containment structure and supported by means of the present invention.
Figures 2, 3:
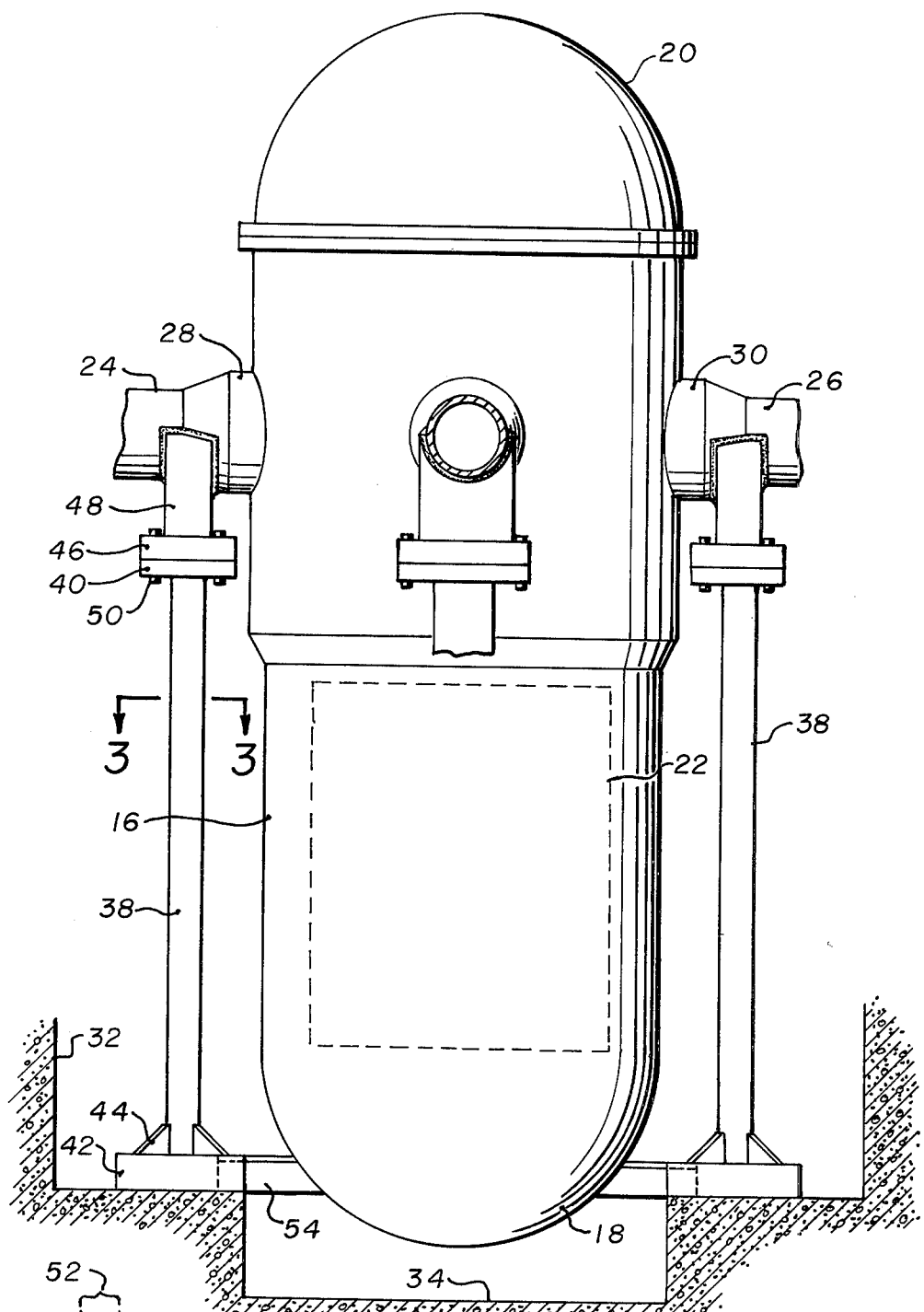
FIG. 2 is an elevational view of the pressure vessel and support structure illustrated in FIG. 1.
FIG. 3 is a section taken along line 3—3 of FIG. 2.

Referring now to the drawings there is shown in FIG. 1 a nuclear reactor pressure vessel 10 mounted according to the invention for operation within a cavity or well 12 formed in biological containment structure 14. The pressure vessel 10 comprises a generally cylindrical hollow shell 16 whose bottom and top ends are closed by an integrally formed hemispherical end closure 18 and a removable domed cover 20, respectively. The vessel 10 is adapted to contain an active portion or core, indicated by the dotted lines 22 in FIG. 2, of known construction, which is operative to generate significant amounts of heat for producing vapor in vapor generators (not shown) that form part of the plant. The described pressure vessel 10 has provision for two primary coolant loops that are utilized to transfer the heat generated in the core 22 to the vapor generator. The coolant loops are represented by reactor inlet conduits 24 and outlet conduits 26 that extend generally radially outwardly from the vessel axis and which connect between the vessel 10 and the respective vapor generators. Although the described apparatus employs two primary coolant loops it should be understood that a greater or lesser number of loops can be employed without departing from the present invention. The respective conduits 24 and 26 are caused to communicate with the interior of the vessel 10 by means of a plurality of radially extending flow nozzles 28 and 30 that are integrally formed on the external surface of the vessel at circumferentially spaced locations thereabout.

The well 12 in containment structure 14 within which the vessel 10 is mounted is provided with a generally cylindrical wall 32 concentrically spaced from the vessel. The bottom of the well 12 is formed by a transversely extending floor, termed the support base 34. A plurality of openings 36 are provided in the wall 32 to accommodate passage of the coolant flow conduits 24 and 26.

It will be appreciated that during operation of the herein described system, especially during operational transients, the pressure vessel 10 will undergo thermally induced displacements with respect to the containment structure 14. Such displacements will occur in directions parallel to the axis of the vessel as well as radially with respect thereto. It will further be appreciated that in the event of a serious system accident, such as for example the rupture of the pressure vessel or of one or more of the coolant flow conduits 24 or 26, high pressure coolant fluid will be discharged from the flow system into the well 12. Forces generated by the discharged fluid will have a tendency to expel the vessel from the well thereby creating a potentially hazardous condition.

Accordingly, the present invention provides means for vertically supporting the pressure vessel 10 within the well 12 in a manner as to effectively accommodate thermally induced displacements of the vessel with respect to the containment structure 14 while at the same time insuring effective retention of the vessel within the well in the event of a serious system accident as heretofore described. Such means comprise a plurality of vertical columns 38 connected between the pressure vessel 10 and the support base 34 at the bottom of the containment well 12. The columns 38 are of sufficient length and columnar strength to support the vessel in an elevated position above the support base 34. They are further designed to be flexible in a direction radial with respect to the vessel axis while at the same time being sufficiently stiff to insure that the natural frequency of the supported vessel will not coincide with the normal range of seismic excitation to which it may be subjected. In the described embodiment of the invention the columns 38 are arranged to support the vessel 10 from the coolant nozzles 24 and 26. It should be understood however, that the columns can support the vessel with comparable effectiveness from any radial appendage extending from the external surface of the vessel, such as for example radially extending support brackets (not shown) that are independent of the nozzles and which may emanate from the vessel surfaces.

Each column 38 illustrated in the drawings is rectangular in section and is provided at its upper end with a rectangular top plate 40 of greater peripheral dimensions than the periphery of the column and at its lower end with a base plate 42 formed of still greater peripheral dimensions. Each base plate 42 is adapted to be fixedly secured to the support base 34 as by means of studs (not shown), or the like. Gussets 44 may be weldedly attached between the base plate 42 and the lower ends of the columns 38 to lend some degree of stiffness to the base plate 42. The columns 38 are fixedly secured to the coolant nozzles 24 and 26 by attachment of the top plates 40 to mounting plates 46 that form the lower end of pedestals 48 which depend from and are weldedly secured to the lower surface of the respective nozzles. Detachable fasteners 50 secure the mounting plates 46 on the pedestals 48 to the top plates 40 as illustrated in the drawings.

In designing the columns 38, their cross-sectional dimensions are determined by the amount of cross-sectional area necessary to impart the required degree of columnar strength to support the vessel as well as to provide sufficient axial stiffness to insure that the natural frequency of the support vessel will not coincide with the normal range of seismic excitation to which the vessel will be subjected. The narrow dimension, or width 52, of the columns is determined as that which will impart sufficient flexure to the columns to accommodate the expected thermally induced radial displacement of the vessel 10 with respect to the wall of the containment well 12. The length of the columns 38 is determined to be that required to locate the bottom end of the vessel above the support base 34 by an amount capable of accommodating the expected axial elongation to be experienced by the vessel during operation of the system. In the described arrangement the necessary column length is obtained by supporting the column base plates 42 in an elevated position upon footings 55 provided at the base of the well 12.

The lower end of the structure may be provided with a key and guide arrangement whose function it is to prevent a tendency of the bottom end of the vessel 10 to experience a rocking motion with respect to the columns 38 which may occur as a result of undue seismic loadings. The arrangement may consist of keys 54 attached to the vessel 10 and mating recesses 56 provided in the base plates 42 for reception of the keys. As shown, the cooperation of the keys 54 and recesses 56 serve to prevent any rotational motion of the free end of the vessel 12 normal to the axes of the columns 38.

It will be appreciated that by means of the present invention a reactor vessel can be more effectively supported within containment structure against vertical loadings imposed upon it during periods of normal system operation as well as in the event of a serious plant accident. By mounting the vessel in the described manner any radial or axial displacements as may occur during normal plant operation can be readily accommodated. At the same time however, because such accommodation is made without the need to provide for sliding movement between the respective members, a tight attachment can be made between the vessel and the mounting means thereby to reduce the possibility of possible expulsion of the vessel from the containment well in the event of a sudden release of high pressure fluid into the well as a result of rupture of the vessel or of one or more of the coolant flow conduits.

It will be understood, therefore, that variations, changes in the details, materials, and arrangements of the parts which have been herein described and illustrated in order to explain the nature of the invention may be made by those skilled in the art within the principles and scope of the invention as expressed in the appended claims.

What is claimed is:
1. The combination comprising:
   a. a support base;
   b. a pressure vessel having a vertically disposed axis and containing a material capable of generating substantial heat therein whereby said vessel is caused to undergo thermally induced radial displacements with respect to said support base; and
   c. means for vertically supporting said pressure vessel upon said support base including a plurality of vertical columns arranged for flexure in a direction substantially radial with respect to the axis of said vessel, each of said columns being fixedly secured at one end to said pressure vessel and at its other end to said support base.

2. The combination recited in claim 1 in which said pressure vessel includes a plurality of radially extending appendages attached at spaced points about the periphery thereof and said one end of each of said columns being fixedly secured to said appendages.

3. The combination recited in claim 2 in which said radially extending appendages comprise flow nozzles attached to the external surface of said vessel for circulating coolant fluid to and from the interior thereof.

4. The combination recited in claim 3 in which said flow nozzles include a pedestal having a downwardly facing bearing plate depending from the undersurface of said nozzles; an upwardly facing top plate provided at the upper end of said columns; said bearing plates being in contiguous engagement with said top plates; and means for preventing relative movement between said bearing plates and said top plates.

5. The combination comprising:
  a. vessel containment structure having a well therein including a vessel support base at the bottom thereof;
  b. a generally cylindrical pressure vessel vertically disposed within said well, said pressure vessel containing a material capable of generating substantial heat therein whereby said vessel is caused to undergo thermally induced radial displacement with respect to said containment structure;
  c. a plurality of radially extending appendages attached to the external surface of said pressure vessel at circumferentially spaced locations thereabout; and
  d. a plurality of vertical columns within said well circumferentially spaced about the exterior of said vessel, each of said columns extending between and being in fixed engagement with said appendages and said support base, said columns being formed of a material to permit flexure thereof in a direction substantially radial with respect to said vessel axis under the inducement of radial displacements of said vessel with respect to said containment structure.

6. The combination recited in claim 5 in which said radial appendages comprise flow nozzles attached to the external surface of said pressure vessel for circulating coolant fluid to and from the interior thereof.

7. The combination recited in claim 5 in which said columns are substantially rectangular in section having a cross-sectional area to impart sufficient stiffness to prevent the coincidence of the natural frequency of the supported vessel with the normal range of seismic excitation, said columns further having at least one cross-sectional dimension to permit unimpeded flexure of the column in a direction radial with respect to the axis of said vessel in response to said radial displacements.

8. The combination recited in claim 7 in which the lower end of said vessel is vertically spaced above said support base and including means for preventing angular displacement of said vessel with respect to said columns.

9. The combination recited in claim 8 in which said angular displacement preventing means comprises a key attached to one of the respective members and means forming a slot adapted to receive said key attached to the other of said members.

* * * * *